(12) United States Patent
Kim et al.

(10) Patent No.: US 11,861,807 B2
(45) Date of Patent: Jan. 2, 2024

(54) METHOD OF COLOR DECOMPOSITION AND METHOD OF DEMOSAICING IMAGES BASED ON DEEP LEARNING USING THE SAME

(71) Applicant: SAMSUNG ELECTRONICS CO., LTD., Suwon-si (KR)

(72) Inventors: Jinhyung Kim, Seoul (KR); Wooseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 17/232,435

(22) Filed: Apr. 16, 2021

(65) Prior Publication Data

US 2022/0092733 A1 Mar. 24, 2022

(30) Foreign Application Priority Data

Sep. 22, 2020 (KR) .......................... 10-2020-0122511

(51) Int. Cl.
*G06T 3/40* (2006.01)
*G06F 18/22* (2023.01)
*G06F 18/214* (2023.01)

(52) U.S. Cl.
CPC .......... *G06T 3/4015* (2013.01); *G06F 18/214* (2023.01); *G06F 18/22* (2023.01); *G06T 3/4046* (2013.01)

(58) Field of Classification Search
CPC ..... G06T 3/4015; G06T 3/4046; G06F 18/22; G06F 18/214
See application file for complete search history.

(56) References Cited

U.S. PATENT DOCUMENTS 7,643,094 B2 1/2010 Kawashima et al.
8,049,763 B2 11/2011 Kwak et al.
(Continued)

FOREIGN PATENT DOCUMENTS

JP 6323152 B2 5/2018
JP 20190004388 A 1/2019
(Continued)

OTHER PUBLICATIONS

Zhu, "Self-guided filter for image denoising", IET 2019 (Year: 2019).*

(Continued)

*Primary Examiner* — Mark Roz
(74) *Attorney, Agent, or Firm* — Muir Patent Law, PLLC

(57) ABSTRACT

In a method of color decomposition, inter-color images indicating similarity between color sensitivities are generated based on color images. Conversion coefficients of the color images and the inter-color images with respect to a white image are determined. A pseudo-white image corresponding to the color images and the inter-color images is generated using the conversion coefficients the pseudo-white image similar to a real white image is generated using the inter-color images indicating similarity between color sensitivities. Deep learning of the artificial neural network is performed efficiently using the color images and the pseudo-white image and the demosaiced images of high quality are generated using the trained artificial neural network that is trained.

18 Claims, 20 Drawing Sheets

(56) References Cited

U.S. PATENT DOCUMENTS

| | | |
|---|---|---|
| 8,223,180 B2 | 7/2012 | Elliott et al. |
| 8,922,581 B2 | 12/2014 | Kim et al. |
| 9,293,096 B2 | 3/2016 | Kouno et al. |
| 9,344,690 B2 | 5/2016 | Nowozin et al. |
| 2007/0024557 A1 | 2/2007 | Rho et al. |

FOREIGN PATENT DOCUMENTS

| | | |
|---|---|---|
| KR | 10-1319321 B1 | 10/2013 |
| KR | 10-2090605 B1 | 3/2020 |

OTHER PUBLICATIONS

Simper, "How to average RGB colors together", kevinsimper.medium.com 2016 (Year: 2016).*

* cited by examiner

FIG. 3
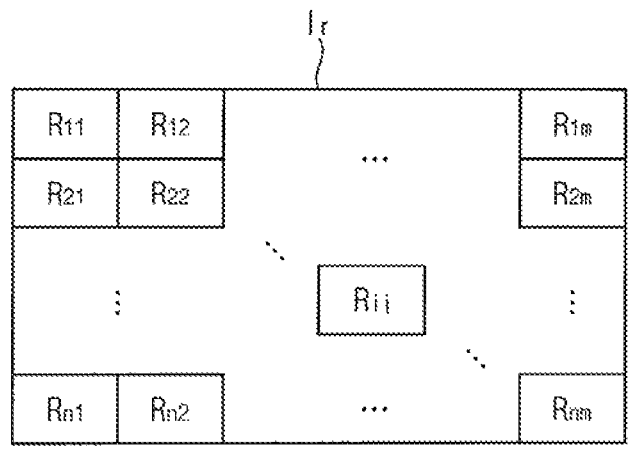
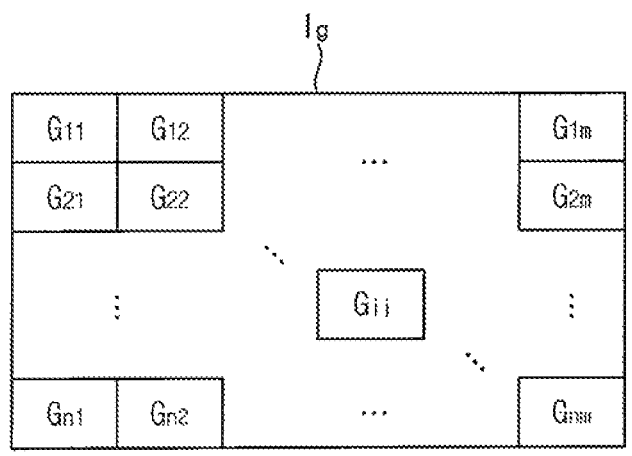
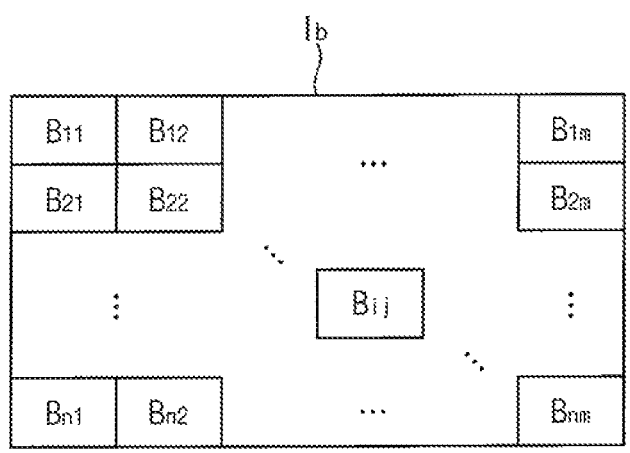

$$\begin{Bmatrix} W_1 \\ W_2 \\ W_3 \\ W_4 \\ \vdots \\ W_n \end{Bmatrix} = \begin{Bmatrix} R_1 & G_1 & B_1 & \sqrt{G_1 B_1} & \sqrt{G_1 R_1} \\ R_2 & G_2 & B_2 & \sqrt{G_2 B_2} & \sqrt{G_2 R_2} \\ R_3 & G_3 & B_3 & \sqrt{G_3 B_3} & \sqrt{G_3 R_3} \\ R_4 & G_4 & B_4 & \sqrt{G_4 B_4} & \sqrt{G_4 R_4} \\ & & \vdots & & \\ R_n & G_n & B_n & \sqrt{G_n B_n} & \sqrt{G_n R_n} \end{Bmatrix} \begin{Bmatrix} C_r \\ C_g \\ C_b \\ C_{gb} \\ C_{gr} \end{Bmatrix}$$

FIG. 16

| | LAYER | WIDTH | HEIGHT | NOF | NOP |
|---|---|---|---|---|---|
| | INL | 128 | 128 | 4 | 0 |
| | CONV | 128 | 128 | 16 | 592 |
| | MPL | 64 | 64 | 16 | 0 |
| ENC1 | CONV | 64 | 64 | 32 | 4,640 |
| ENC1 | CONV | 64 | 64 | 32 | 9,248 |
| ENC1 | EWS | 64 | 64 | 32 | 0 |
| ENC2 | CONV | 32 | 32 | 64 | 18,496 |
| ENC2 | CONV | 32 | 32 | 64 | 36,928 |
| ENC2 | EWS | 32 | 32 | 64 | 0 |
| ENC3 | CONV | 16 | 16 | 128 | 73,856 |
| ENC3 | CONV | 16 | 16 | 128 | 147,584 |
| ENC3 | EWS | 16 | 16 | 128 | 0 |
| DEC1 | CONVT | 32 | 32 | 64 | 73,792 |
| DEC1 | CONV | 32 | 32 | 64 | 36,928 |
| DEC2 | CONVT | 64 | 64 | 32 | 18,464 |
| DEC2 | CONV | 64 | 64 | 32 | 9,248 |
| DEC3 | CONVT | 128 | 128 | 16 | 4,624 |
| DEC3 | EWS | 128 | 128 | 16 | 0 |
| DEC3 | CONV | 128 | 128 | 3 | 435 |
| | TOTAL | | | | 434,835 |

FIG. 17

|  | CS1 | CS2 | CSp |
|---|---|---|---|
| PSNR (dB) | 36.3 | 34.9 | 37.9 |

|  | CS3 | CS4 | CSp |
|---|---|---|---|
| COMPLEXITY (TOPs) | 39.8 | 38.4 | 0.93 |

METHOD OF COLOR DECOMPOSITION AND METHOD OF DEMOSAICING IMAGES BASED ON DEEP LEARNING USING THE SAME

CROSS-REFERENCE TO RELATED APPLICATION

Korean Patent Application No. 10-2020-0122511, filed on Sep. 22, 2020 in the Korean Intellectual Property Office, and entitled: "Method of Color Decomposition and Method of Demosaicing Images Based on Deep Learning Using the Same," is incorporated by reference herein in its entirety.

BACKGROUND

1. Field

Example embodiments relate generally to image processing, and more particularly to a method of color decomposition and a method of demosaicing images based on deep learning using the color decomposition method.

2. Description of the Related Art

Image processing based on deep learning is performed using a sufficient amount of training data or learning data for training of a deep learning module. For example, tens through millions of training data of various kinds may be called for to prevent over-fitting during training and enhance performance of the deep learning module. It is not straightforward to secure sufficient data for training using a real image sensor.

SUMMARY

Embodiments are directed to a method of color decomposition in which inter-color images indicating similarity between color sensitivities are generated based on color images. Conversion coefficients of the color images and the inter-color images with respect to a white image are determined. A pseudo-white image corresponding to the color images and the inter-color images is generated using the conversion coefficients.

According to example embodiments, a method of demosaicing images includes generating inter-color images indicating similarity between color sensitivities based on color images, determining conversion coefficients of the color images and the inter-color images with respect to a white image, generating a pseudo-white image corresponding to the color images and the inter-color images using the conversion coefficients, generating training mosaic images based on the color images and the pseudo-white image, training an artificial neural network based on the training mosaic images, and generating demosaiced color images corresponding to input mosaic images based on the artificial neural network that is trained.

According to example embodiments, a method of demosaicing images includes generating a green-blue image indicating similarity between green sensitivity and blue sensitivity, and a green-red image indicating similarity between green sensitivity and red sensitivity based on a red image, a green image and a blue image, determining conversion coefficients of the red image, the green image, the blue image, green-blue image and the green-red image with respect to a white image, generating a pseudo-white image corresponding to the red image, the green image, the blue image, the green-blue image and the green-red image using the conversion coefficients, generating training mosaic images based on the red image, the green image, the blue image and the pseudo-white image, training an artificial neural network based on the training mosaic images, and generating demosaiced color images corresponding to input mosaic images based on the artificial neural network that is trained.

BRIEF DESCRIPTION OF THE DRAWINGS

Features will become apparent to those of skill in the art by describing in detail example embodiments with reference to the attached drawings in which:

FIGS. 3 and 4 are diagrams illustrating images corresponding to a color decomposition method according to example embodiments.

FIG. 5 is a diagram for describing an example embodiment of determining conversion coefficients included in a color decomposition method according to example embodiments.

FIG. 16 is a diagram illustrating parameters of the artificial neural network of FIG. 15.

FIG. 17 is a diagram illustrating effects of a demosaicing method based on deep learning according to example embodiments.

DETAILED DESCRIPTION

Figure 1:
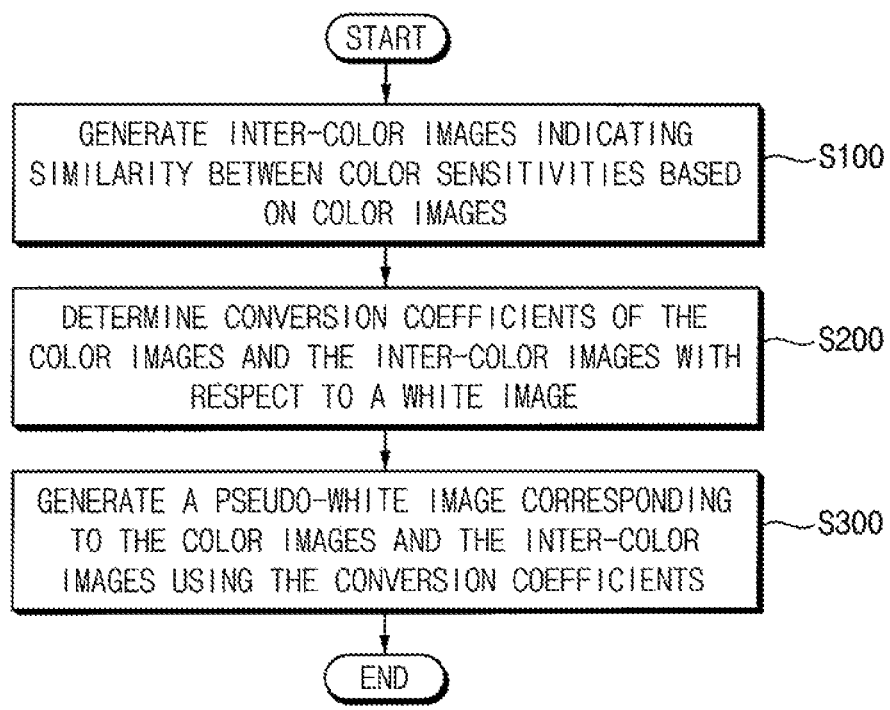
FIG. 1 is a flow chart illustrating a color decomposition method according to example embodiments.

FIG. 1 is a flow chart illustrating a color decomposition method according to example embodiments.

Referring to FIG. 1, inter-color images indicating similarity between color sensitivities may be generated based on color images (S100).

The similarity between color sensitivities may be varied according to a wavelength of a light incident on an image sensor. The similarity between color sensitivities may increase as a difference between color pixel values decreases in a condition of the same brightness, as will be described in further detail below with reference to FIG. 6.

Conversion coefficients of the color images and the inter-color images with respect to a white image may be determined (S200).

In some example embodiments, as will be described in further detail below with reference to FIG. 5, the conversion coefficients may be determined using a least square method based on a matrix that includes color pixel values of the color images and inter-color pixel values of the inter-color images as components of the matrix, and real white pixel values obtained, for example, by an RGBW image sensor.

In some example embodiments, as will be described in further detail below with reference to FIG. 5, the inter-color pixel value of the inter-color image may be a square root of a multiplication of color pixel values of different color images corresponding to the inter-color image.

A pseudo-white image corresponding to the color images and the inter-color images may be generated using the conversion coefficients (S300). The pseudo-white image is differentiated from the read white image that is obtained using a real image sensor including white pixels.

In some example embodiments, the pseudo-white image may be provided as additional information for deep learning of an artificial neural network associated with image processing. In some example embodiments, the pseudo-white image may be used as display data for a display device including white pixels.

As such, the color decomposition method according to example embodiments may generate the pseudo-white image similar to a real white image using the inter-color images that indicate similarity between color sensitivities.

As will be described in further detail below, the pseudo-white image may be used in a method of demosaicing images according to example embodiments based on deep learning. The deep learning of the artificial neural network may be performed efficiently using the color images and the pseudo-white image, and the demosaiced images of high quality may be generated using the trained artificial neural network that is trained.

Figure 2:
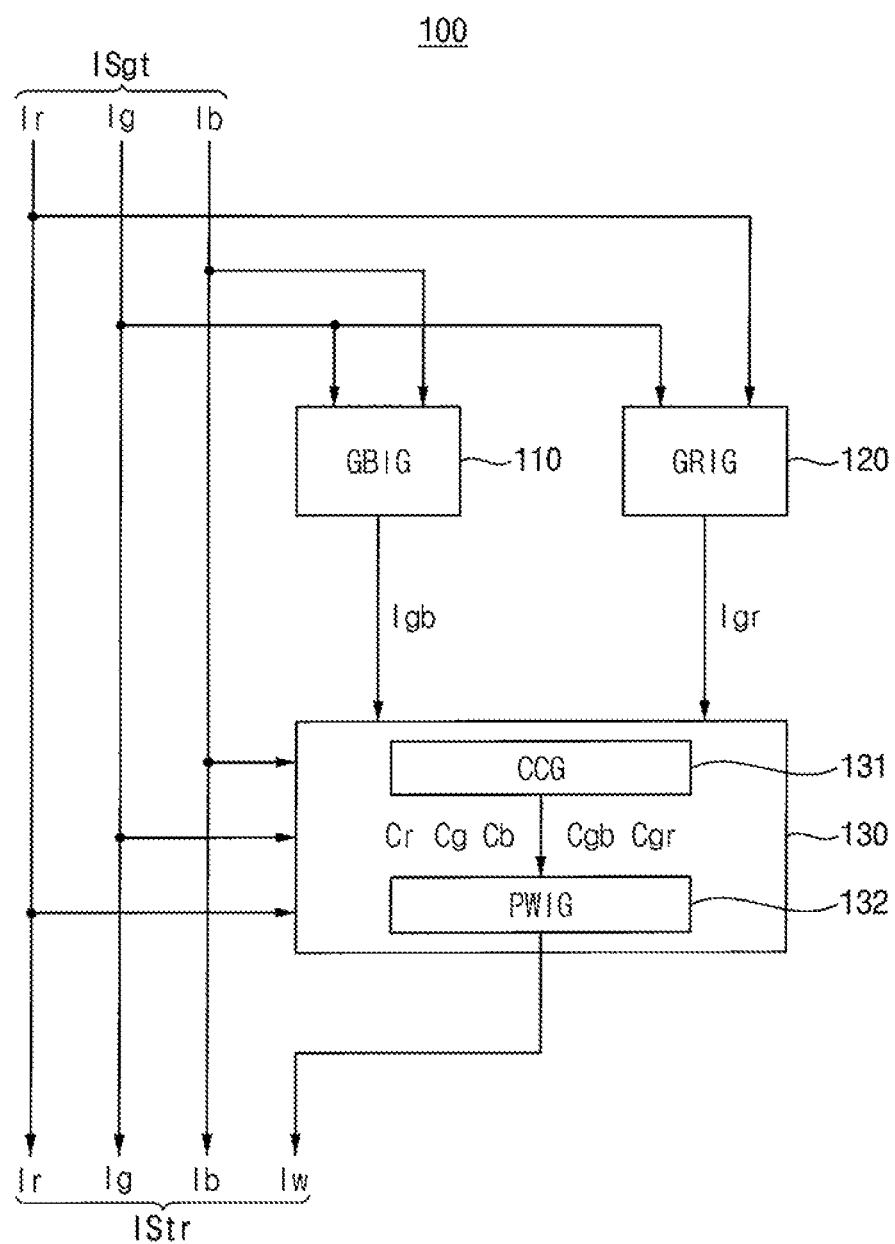
FIG. 2 is a block diagram illustrating a color decomposition device according to example embodiments.

FIG. 2 is a block diagram illustrating a color decomposition device according to example embodiments.

Referring to FIG. 2, a color decomposition device 100 may include a first inter-color image generator GBIG 110, a second inter-color image generator GRIG 120, and an image processing unit 130.

The first inter-color image generator 110 and the second inter-color image generator 120 may generate inter-color images that indicate similarity between color sensitivities based on color images. In some example embodiments, the color images may include a red image Ir, a green image Ig, and a blue image Ib.

Herein, some example embodiments are described based on a non-limiting example that the color images include the red image Ir, the green image Ig, and the blue image Ib. However, according to example embodiments, the color images may include arbitrary combination of various colors.

When the color images include the red image Ir, the green image Ig, and the blue image Ib, the inter-color images may include a green-blue image Igb, which indicates similarity between green sensitivity and blue sensitivity, and a green-red image Igr, which indicates similarity between green sensitivity and red sensitivity.

The first inter-color image generator 110 may generate the green-blue image Igb indicating the similarity between the green sensitivity and the blue sensitivity based on the green image Ig and the blue image Ib. The second inter-color image generator 120 may generate the green-red image Igr indicating the similarity between the green sensitivity and red sensitivity based on the green image Ig and the red image Ir.

The image processing unit 130 may include a conversion coefficient generator CCG 131 and a pseudo-white image generator PWIG 132.

The conversion coefficient generator 131 may determine conversion coefficients of the color images and the inter-color images with respect to a white image. The pseudo-white image generator 132 may generate a pseudo-white image corresponding to the color images and the inter-color images using the conversion coefficients.

When the color images include the red image Ir, the green image Ig, and the blue image Ib, the conversion coefficient generator 131 may determine a red conversion coefficient Cr of the red image Ir with respect to the white image, a green conversion coefficient Cg of the green image Ig with respect to the white image, a blue conversion coefficient Cb of the blue image Ib with respect to the white image, a green-blue conversion coefficient Cgb of the green-blue image Igb with respect to the white image, and a green-red conversion coefficient Cgr of the green-red image Igr with respect to the white image. Here the green-blue image Igb and the green-red image Igr correspond to the above-described inter-color images. In this case, the pseudo-white image generator 132 may generate a pseudo-white image Iw based on the red conversion coefficient Cr, the green conversion coefficient Cg, the blue conversion coefficient Cb, the green-blue conversion coefficient Cgb, and the green-red conversion coefficient Cgr.

As will be described in further detail below, the red image Ir, the green image Ig, the blue image Ib, and the pseudo-white image Iw may be provided as learning data set or training data set IStr of an artificial neural network for image processing such as demosaicing. When the artificial neural network is designed to generate a demosaiced red image, a demosaiced green image, and a demosaiced blue image based on a mosaic image, the red image Ir, the green image Ig, and the blue image Ib may be used as a ground truth image set ISgt for verifying a learning result of the artificial neural network.

As such, the color decomposition method according to example embodiments may generate the pseudo-white image similar to a real white image using the inter-color images indicating similarity between color sensitivities. In addition, the demosaicing method based on deep learning according to example embodiments may efficiently perform deep learning of the artificial neural network using the color images and the pseudo-white image, and generate the demosaiced images of high quality using the trained artificial neural network that is trained.

Figure 4:
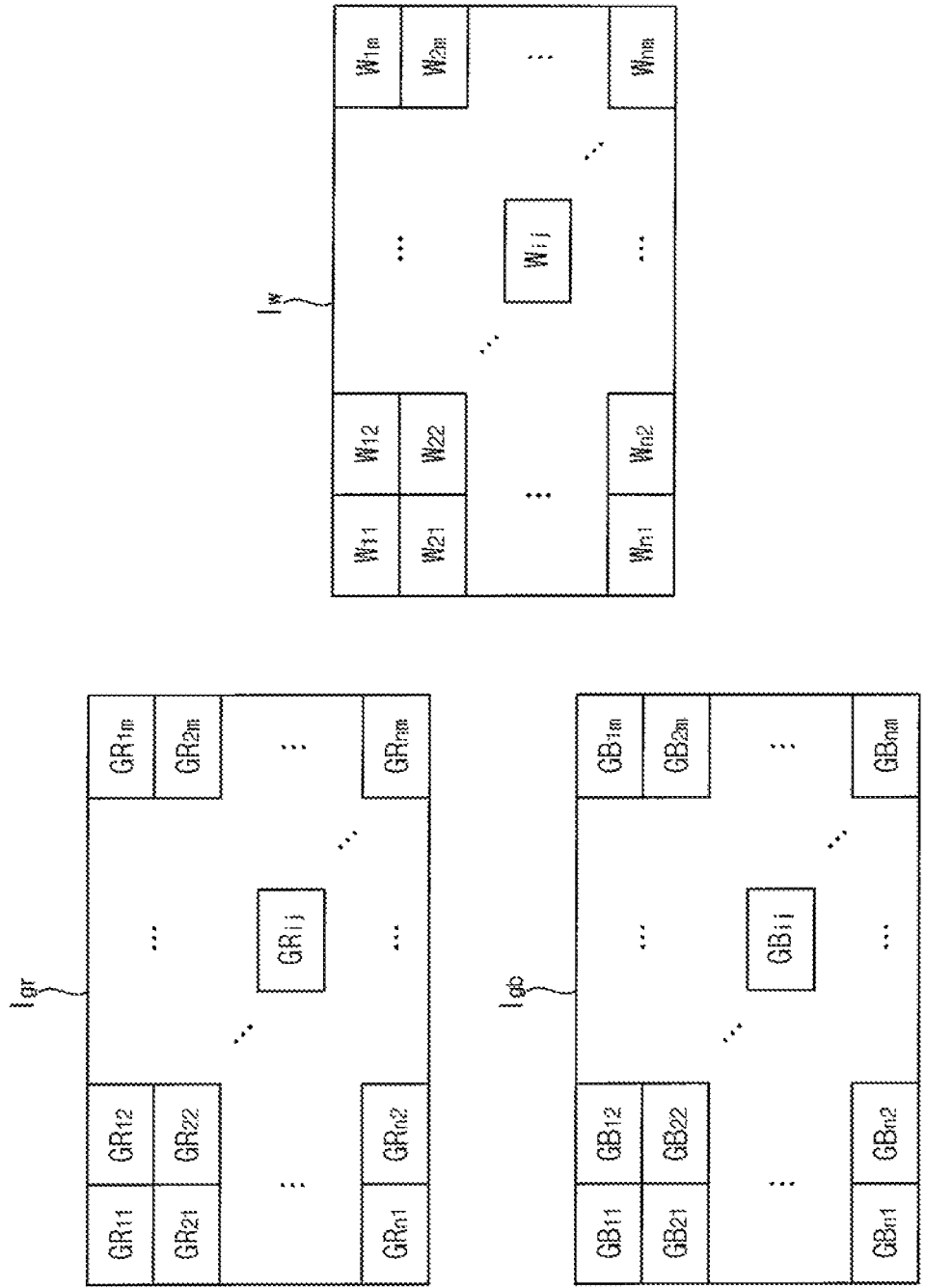

FIGS. 3 and 4 are diagrams illustrating images corresponding to a color decomposition method according to example embodiments.

FIGS. 3 and 4 illustrate a red image Ir, a green image Ig, a blue image Ib, a green-blue image Igb, and a green-red image Igr, each composed of n pixel rows and m pixel columns.

Referring to FIGS. 3 and 4, the red image Ir includes m*n red pixel values R11~Rnm, the green image Ig includes m*n green pixel values G11~Gnm, and the blue image Ib includes m*n blue pixel values B11~Bnm. The red image Ir, the green image Ig, and the blue image Ib correspond to demosaiced images or full color images that have pixel values of all pixels. The green-blue image Igb includes m*n green-blue pixel values GB11~GBnm, the green-red image Igr includes m*n green-red pixel values GR11~GRnm, and the pseudo-white image Iw includes m*n white pixel values W11~Wnm.

Referring to FIGS. 3 and 4, each image includes n*m pixel values, and the pixel values in the different images correspond to each other according to pixel positions.

FIG. 5 is a diagram for describing an example embodiment of determining conversion coefficients included in a color decomposition method according to example embodiments.

A pixel value of a pseudo-white image may be generated by Equation 1.

$$W = C_r*R + C_g*G + C_b*B + C_{gb}GB + C_{gr}*GR \quad \text{[Equation 1]}$$

In Equation 1, W indicates the white pixel value of the pseudo-white image, R indicates a red pixel value of the red image, G indicates a green pixel value of the green image, B indicates a blue pixel value of the blue image, GB indicates a green-blue pixel value of the green-blue image, and GR indicates a green-red pixel value of the green-red image.

Cr indicates a red conversion coefficient of the red image with respect to the white image, Cg indicates a green conversion coefficient of the green image with respect to the white image, Cb indicates a blue conversion coefficient of the blue image with respect to the white image, Cgb indicates a green-blue conversion coefficient of the green-blue image with respect to the white image, and Cgr indicates a green-red conversion coefficient of the green-red image with respect to the white image.

Referring to FIG. 5, a plurality of equations with respect to a plurality of corresponding pixels may be arranged as a matrix equation as represented by Equation 2.

$$W = AC \quad \text{[Equation 2]}$$

FIG. 5 illustrates an example embodiment of the matrix equation as represented by Equation 2.

In FIG. 5, W indicates a column vector including a plurality of white pixel values W1~Wn of the white image.

In FIG. 5, C indicates a column vector including the red conversion coefficient Cr, the green conversion coefficient Cg, the blue conversion coefficient Cb, the green-blue conversion coefficient Cgb, and the green-red conversion coefficient Cgr.

In FIG. 5, A indicates a matrix including the red pixel values R1~Rn of the red image, the green pixel values G1~Gn of the green image, the blue pixel values B1~Bn of the blue image, the green-blue pixels values $\sqrt{G_1B_1}$~$\sqrt{G_nB_n}$ of the green-blue image, and the green-red pixel values $\sqrt{G_1R_1}$~$\sqrt{G_nR_n}$ of the green-red image as components of the matrix.

Referring to the above, the green-blue pixel value $\sqrt{G_iB_i}$ (i is an integer) may be set to be a square root of a multiplication of the green pixel value Gi and the blue pixel value Bi, and the green-red pixel value $\sqrt{G_iR_i}$ may be set to be a square root of a multiplication of the green pixel value Gi and the red pixel value Ri.

The column vector C may be determined using white pixel values of a real white image that is obtained by an image sensor such as an RGBW image sensor including white pixels. The matrix equation in Equation 2 and FIG. 5 may be solved as represented by Equation 3 using a least square method to obtain the column vector C including the red conversion coefficient Cr, the green conversion coefficient Cg, the blue conversion coefficient Cb, the green-blue conversion coefficient Cgb, and the green-red conversion coefficient Cgr.

$$C = (A^T A)^{-1} A^T W \quad \text{[Equation 3]}$$

In Equation 3, $A^T$ indicates a transposed matrix of the matrix A, and $A^{-1}$ indicates an inverse matrix of the matrix A.

An example of the conversion coefficients obtained as such is shown in Equation 4. The white pixel values of the pseudo-white image may be calculated by applying the obtained conversion coefficients to Equation 1 or Equation 2.

$$Cr = 0.71$$

$$Cg = 1.4$$

$$Cb = 1.51$$

$$Cgb = -1.34$$

$$Cgr = -0.62 \quad \text{[Equation 4]}$$

As shown in Equation 4, the conversion coefficients of the color images with respect to the white image (that is, the red conversion coefficient Cr, the green conversion coefficient Cg, and the blue conversion coefficient Cb) may have positive values. In contrast, the conversion coefficients of the inter-color images with respect to the white image (that is, the green-blue conversion coefficient Cgb and the green-red conversion coefficient Cgr) may have negative values.

The green-blue pixel value $\sqrt{G_iB_i}$ of the green-blue image Igb may increase as the similarity between the green sensitivity and the blue sensitivity increases. In addition, green-red pixel value $\sqrt{G_iR_i}$ of the green-blue image Igb may increase as the similarity between the green sensitivity and the red sensitivity increases. When the green-blue conversion coefficient Cgb has a negative value, the white pixel value Wi of the pseudo-white image Iw decreases as the green-blue pixel value $\sqrt{G_iB_i}$ of the green-blue image Igb corresponding to the white pixel value Wi increases. In addition, when the green-red conversion coefficient Cgr has a negative value, the white pixel value Wi of the pseudo-white image Iw decreases as the green-red pixel value $\sqrt{G_iR_i}$ of the green-red image Igr corresponding to the white pixel value Wi increases.

Even though an example embodiment that the pseudo-white image is generated using color images including the red image Ir, the green image Ig, and the blue image Ib, the color decomposition method according to example embodiments may be applied to arbitrary color images in which similarity between color sensitivities may be considered.

With respect to arbitrary color images, the inter-color pixel value of the inter-color image may increase as the similarity between the color sensitivities increases. The conversion coefficients of the color images with respect to the white image may have positive values, and the conversion coefficients of the inter-color images with respect to the white image may have negative values. In this case, the white pixel value of the pseudo-white image may decrease as the inter-color pixel value of the inter-color image corresponding to the white pixel value increases.

Figure 6:
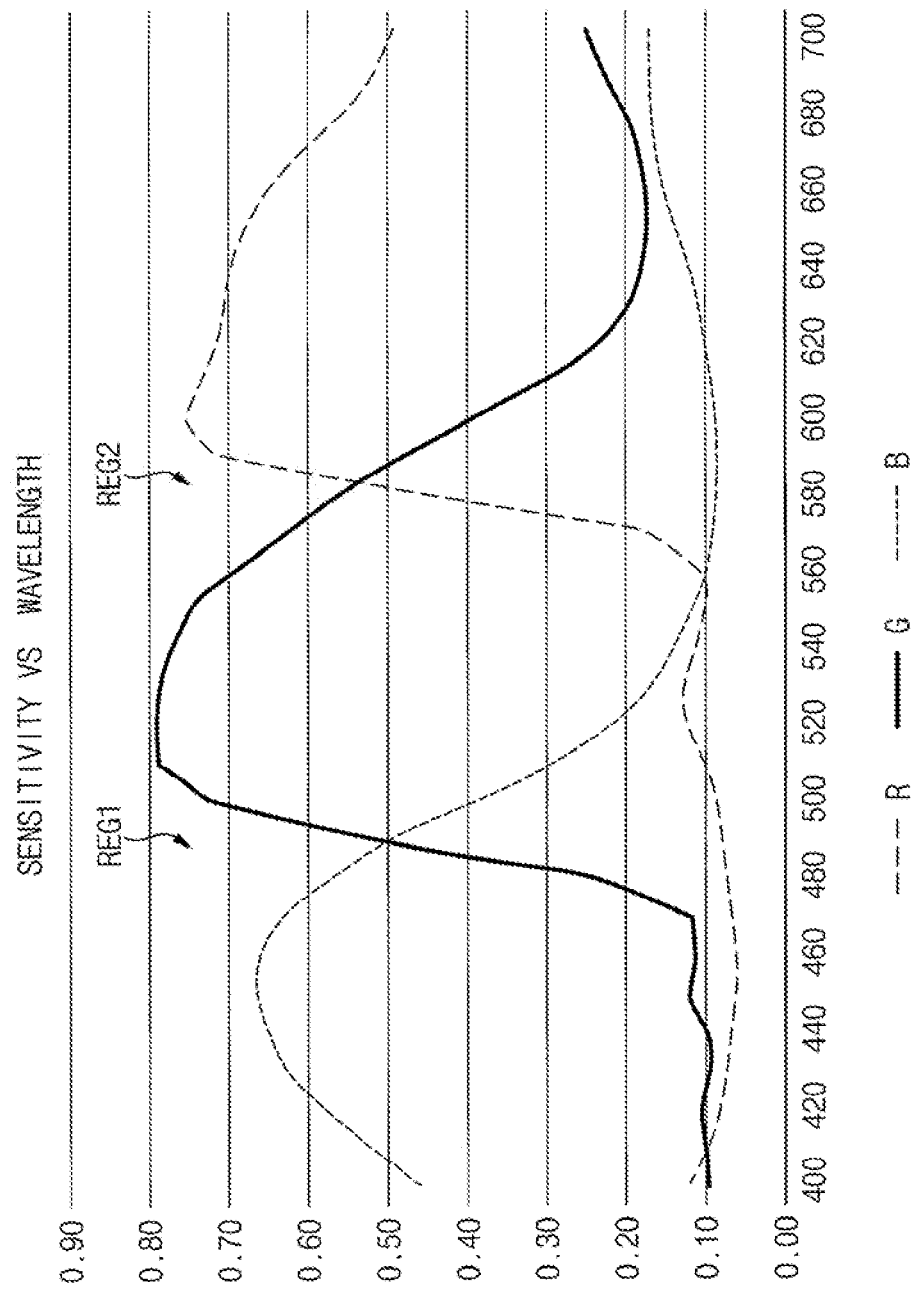
FIG. 6 is a diagram illustrating an example of color sensitivities of an image sensor according to wavelength.
Figure 7:
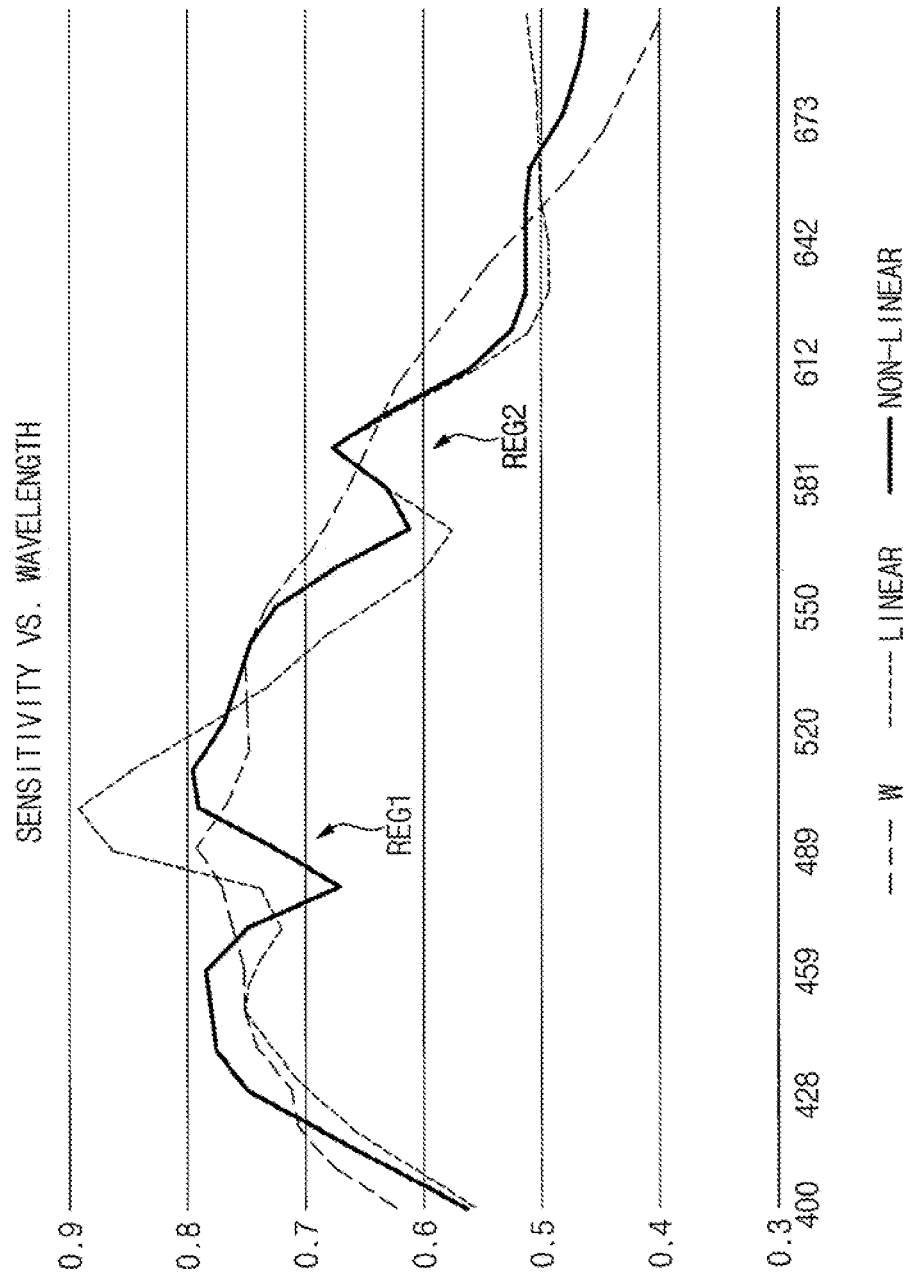
FIG. 7 is a diagram illustrating an example of sensitivities of white images according to wavelength.

FIG. 6 is a diagram illustrating an example of color sensitivities of an image sensor according to wavelength, and FIG. 7 is a diagram illustrating an example of sensitivities of white images according to wavelength.

In FIGS. 6 and 7, the horizontal axis represents wavelength of light in nano-meter (nm) and the vertical axis represents color sensitivity.

FIG. 6 illustrates unique spectrum color sensitivities of a red image, a green image, and a blue image that are obtained by a real RGB image sensor. R indicates the red sensitivity, G indicates the green sensitivity, and B indicates the blue sensitivity.

As illustrated in FIG. 6, the similarity between the blue sensitivity and the green sensitivity may be increased in a first overlapping region REG1, and the similarity between the green sensitivity and the red sensitivity may be increased in a second overlapping region REG2. Here, the increase of the color sensitivities indicates the decrease of the difference between the color sensitivities.

FIG. 7 illustrates white sensitivities of various white images. W indicates the white sensitivity of a real white image that is obtained by an RGBW image sensor including white pixels, LINEAR indicates the white sensitivity that is obtained by a general method of a linear scheme based on luminance of RGB images, and NON-LINEAR indicates the white sensitivity of the pseudo-white image that is obtained by a color decomposition method of a non-linear scheme according to example embodiments.

As illustrated in FIG. 7, the linear scheme of the general method may cause over-amplification of the white sensitivity of the pseudo-white image in the first and second overlapping regions REG1 and REG2. To repress such over-amplification in the overlapping regions, an inter-color pixel value of each inter-color image may be set to be a square root of a multiplication of color pixel values of different color images corresponding to the each inter-color image, as described above.

If two corresponding pixel values of the different color images are represented by A and B, a relation between an arithmetic average $(A+B)/2$ and a geometric average $(A*B)^{1/2}$ of the two pixel value A and B may be represented by Equation 5.

$$(A+B)/2 \geq (A*B)^{1/2} \qquad \text{[Equation 5]}$$

The arithmetic average $(A+B)/2$ corresponds to an averaged pixel values, that is, an averaged brightness of the two pixel values A and B. The geometric average $(A*B)^{1/2}$ corresponds to the similarity between the color sensitivities, that is, an inter-color pixel value of the two pixel values A and B.

When the brightness corresponding to the two pixel values A and B is fixed, that is, when the arithmetic average $(A+B)/2$ is fixed, the geometric average $(A*B)^{1/2}$ corresponding to the similarity may be increased as the difference between the two pixel values A and B is decreased. Thus, the similarity may be maximum when the two pixel values A and B are equal to each other.

As such, the inter-color pixel value may efficiently represent the similarity between color sensitivities by setting the inter-color pixel value to be a root of a multiplication of the corresponding color pixel values of the different color images. The inter-color pixel value may be reflected to the white pixel value of the pseudo-white image as Equation 1, and the white sensitivity (NON-LINEAR) of the pseudo-white image may be generated to be similar to the white sensitivity (W) of the real white image as illustrated in FIG. 7.

Figure 8:
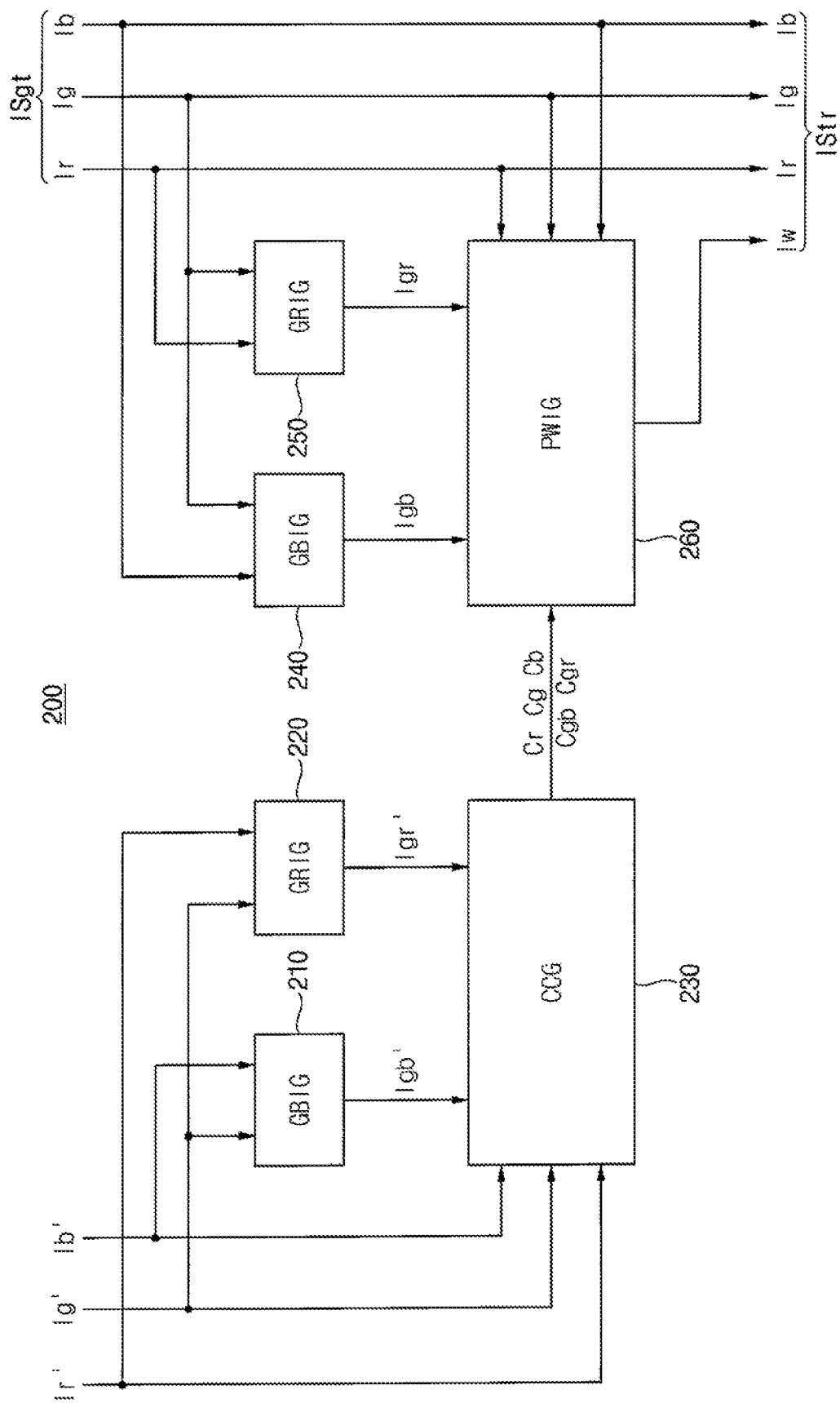
FIG. 8 is a block diagram illustrating a color decomposition device according to example embodiments.

FIG. 8 is a block diagram illustrating a color decomposition device according to example embodiments. The descriptions repeated with respect to FIG. 2 may be omitted.

Referring to FIG. 8, a color decomposition device 200 may include a first inter-color image generator GBIG 210, a second inter-color image generator GRIG 220, a conversion coefficient generator CCG 230, a third inter-color image generator GBIG 240, a fourth inter-color image generator GRIG 2500, and a pseudo-white image generator PWIG 260.

The first inter-color image generator 210 and the second inter-color image generator 220 may generate first inter-color images Igb' and Igr' indicating similarity between color sensitivities based on first color images Ir', Ig' and Ir'.

Thus, the first inter-color image generator 210 may generate the first green-blue image Igb' indicating the similarity between the green sensitivity and the blue sensitivity based on the first green image Ig' and the first blue image Ib'. The second inter-color image generator 220 may generate the first green-red image Igr' indicating the similarity between the green sensitivity and red sensitivity based on the first green image Ig' and the first red image Ir'.

The conversion coefficient generator 230 may determine conversion coefficients Cr, Cg, Cb, Cgb, and Cgr based on the first color images Ir', Ig', and Ib' and the inter-color images Igb' and Igr'. In some example embodiments, the conversion coefficient generator 230 may determine the conversion coefficients Cr, Cg, Cb, Cgb, and Cgr using the least square method described above with reference to FIG. 5.

The third inter-color image generator 240 and the fourth inter-color image generator 250 may generate second inter-color images Igb and Igr indicating similarity between color sensitivities based on second color images Ir, Ig, and Ir.

Thus, the third inter-color image generator 240 may generate the second green-blue image Igb indicating the similarity between the green sensitivity and the blue sensitivity based on the second green image Ig and the second blue image Ib. The fourth inter-color image generator 250 may generate the second green-red image Igr indicating the similarity between the green sensitivity and red sensitivity based on the second green image Ig and the second red image Ir.

The pseudo-white image generator 260 may generate a pseudo-white image Iw corresponding to the second color images Ir, Ig, and Ib and the second inter-color images Igb and Igr using the conversion coefficients Cr, Cg, Cb, Cgb, and Cgr. In some example embodiments, each white pixel value of the pseudo-white image Iw may be determined based on Equation 1.

The color decomposition device 100 of FIG. 2 may generate the conversion coefficients and the pseudo-white image based on the same color images. In contrast, the color decomposition device 200 of FIG. 8 may determine the conversion coefficients Cr, Cg, Cb, Cgb, and Cgr based on the first color images Ir', Ig', and Ib', and generate the pseudo-white image Iw based on the second color images Ir, Ig, and Ib different from the first color images Ir', Ig', and Ib'. As such, the first color images Ir', Ig', and Ib' used in determining the conversion coefficients and the second color images Ir, Ig, and Ib used in generating the pseudo-white image may be provided independently.

The second red image Ir, the second green image Ig, the second blue image Ib, and the pseudo-white image Iw may be provided as learning data set or training data set IStr of an artificial neural network for image processing such as demosaicing. The second red image Ir, the second green image Ig, and the second blue image Ib may be used as a ground truth image set ISgt for verifying a learning result of the artificial neural network.

Figure 9:
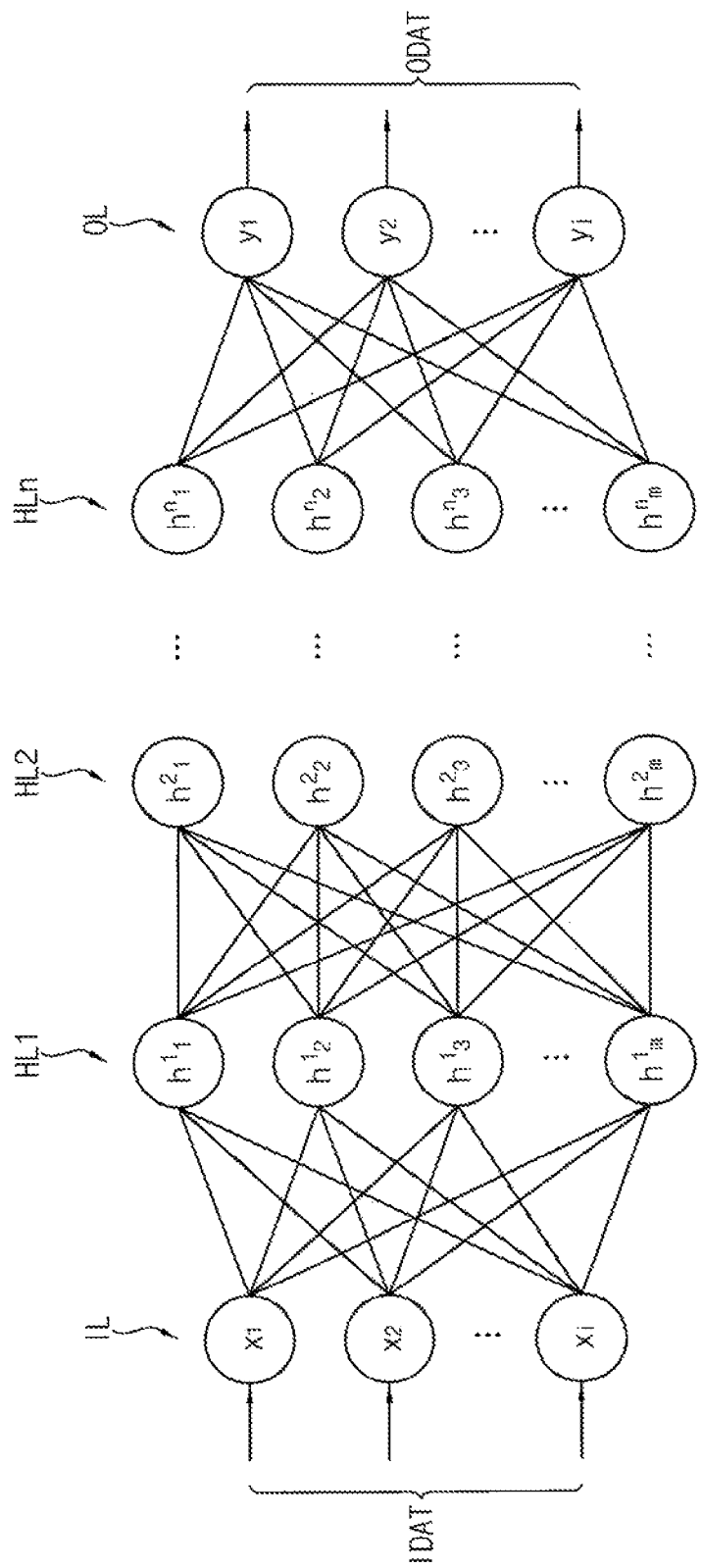
FIGS. 9 and 10 are diagrams for describing examples of a deep learning neural network structure that is driven by a machine learning device according to example embodiments.
Figure 10:
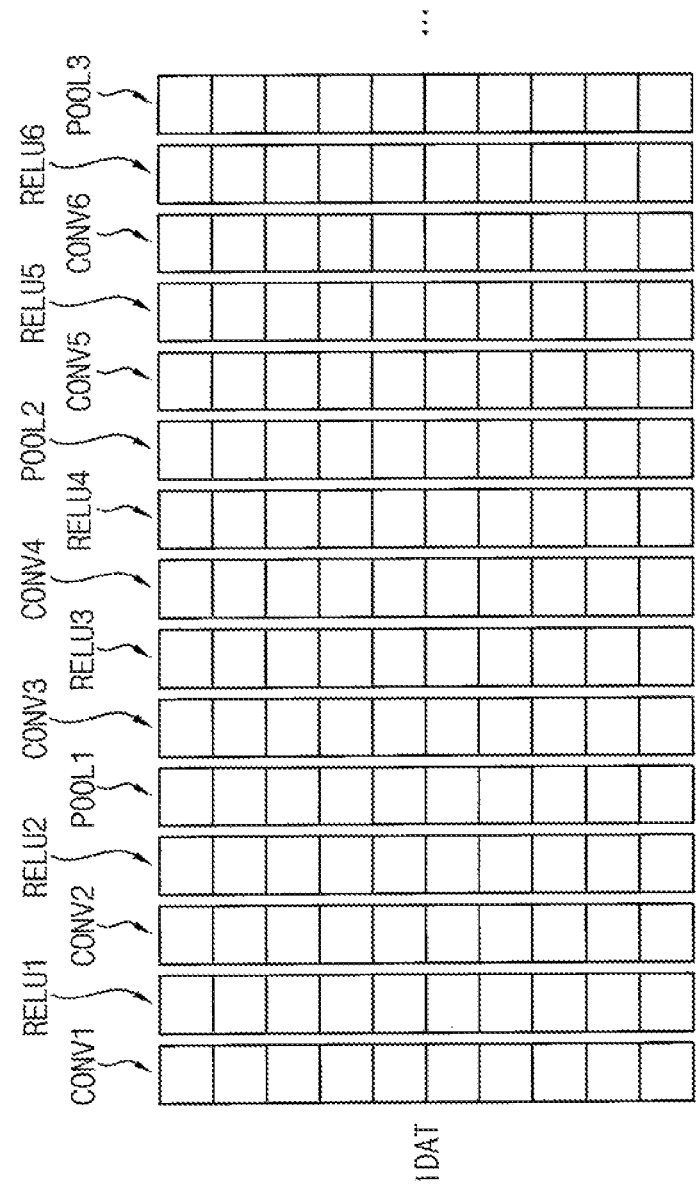

FIGS. 9 and 10 are diagrams for describing examples of a deep learning neural network structure that is driven by a machine learning device according to example embodiments.

Referring to FIG. 9, a general neural network may include an input layer IL, a plurality of hidden layers HL1, HL2, ..., HLn, and an output layer OL.

The input layer IL may include i input nodes $x_1$, $x_2$, ..., $x_i$, where i is a natural number. Input data (e.g., vector input data) IDAT whose length is i may be input to the input nodes $x_1$, $x_2$, ..., $x_i$ such that each element of the input data IDAT is input to a respective one of the input nodes $x_1$, $x_2$, ..., $x_i$.

The plurality of hidden layers HL1, HL2, HLn may include n hidden layers, where n is a natural number, and may include a plurality of hidden nodes $h^1_1$, $h^1_2$, $h^1_3$, ..., $h^1_m$, $h^2_1$, $h^2_2$, $h^2_3$, $h^2_m$, $h''_1$, $h''_2$, $h''_3$, ..., $h''_m$. For example, the hidden layer HL1 may include m hidden nodes $h^1_1$, $h^1_2$, $h^1_3$, ..., $h^1_m$, the hidden layer HL2 may include m hidden nodes $h^2_1$, $h^2_2$, $h^2_3$, ..., $h^2_m$, and the hidden layer HLn may include m hidden nodes $h''_1$, $h''_2$, $h''_3$, ..., $h''_m$, where m is a natural number.

The output layer OL may include j output nodes $y_1$, $y_2$, ..., $y_j$, where j is a natural number. Each of the output nodes $y_1$, $y_2$, ..., $y_j$ may correspond to a respective one of classes to be categorized. The output layer OL may output the output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 9 may be represented by information on branches (or connections) between nodes illustrated as lines, and a weighted value assigned to each branch. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation, or calculation on the received output, and may output a result of the computing operation, computation, or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 9 may not be suitable for handling input image data (or input sound data) because each node (e.g., the node $h^1_1$) is connected to all nodes of a previous layer (e.g., the nodes $x_1$, $x_2$, ..., $x_i$ included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the convolutional neural network.

Referring to FIG. 10, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3, and FC.

Unlike the general neural network, each layer of the convolutional neural network may have three dimensions of width, height, and depth. Thus, data that is input to each layer may be volume data having three dimensions of width, height, and depth. For example, if an input image in FIG. 10 has a size of 32 width units (e.g., 32 pixels) and 32 height units (e.g., 32 pixels) and three color channels R, G, and B, then input data IDAT corresponding to the input image may have a size of 32×32×3. The input data IDAT in FIG. 3B may be referred to as input volume data or input activation volume.

Each of convolutional layers CONV1, CONV2, CONV3, CONV4, CONV5, and CONV6 may perform a convolutional operation on input volume data. In an image processing, the convolutional operation represents an operation in which image data is processed based on a mask with weighted values, and an output value is obtained by multiplying input values by the weighted values and adding up the total multiplied values. The mask may be referred to as a filter, window, or kernel.

In further detail, parameters of each convolutional layer may consist of or include a set of learnable filters. Every filter may be spatially small (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, then output volume data of the convolutional layer CONV1 may have a size of 32×32×12 (e.g., a depth of volume data increases).

Each of RELU layers RELU1, RELU2, RELU3, RELU4, RELU5, and RELU6 may perform a rectified linear unit operation that corresponds to an activation function defined by, e.g., a function $f(x)=\max(0, x)$ (e.g., an output is zero for all negative input x). For example, if input volume data having a size of 32×32×12 passes through the RELU layer RELU1 to perform the rectified linear unit operation, then output volume data of the RELU layer RELU1 may have a size of 32×32×12 (e.g., a size of volume data is maintained).

Each of pooling layers POOL1, POOL2, and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, then output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing an image spatial size and extracting an image characteristic.

It is understood that the types and number of layers included in the convolutional neural network may not be limited to the example described above with reference to FIG. 3B and may be changed or vary according to one or more other example embodiments. In addition, it is understood that the convolutional neural network may further include other layers such as a softmax layer for converting score values corresponding to predicted results into probability values, a bias adding layer for adding at least one bias, or the like.

Figure 11:
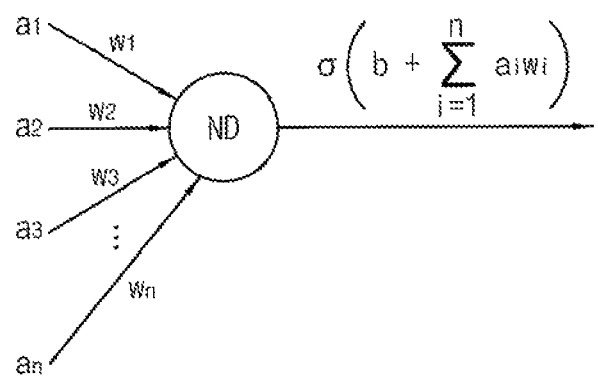
FIG. 11 is a diagram illustrating an example of a node included in a neural network.

FIG. 11 is a diagram illustrating an example of a node included in a neural network.

FIG. illustrates an example node operation performed by a node ND in a neural network. When N inputs $a_1 \sim a_n$ are provided to the node ND, the node ND may multiply the n inputs $a_1 \sim a_n$ and corresponding n weights $w_1 \sim w_n$, respectively, may sum n values obtained by the multiplication, may add an offset "b" to a summed value, and may generate one output value by applying a value to which the offset "b" is added to a specific function "σ". The learning operation may be performed based on the training data to update all nodes in the neural network.

As described above, image processing based on deep learning calls for a sufficient amount of training data or learning data for training of a deep learning module. For example, tens through millions of training data of various kinds may be used to prevent over-fitting during training and enhance performance of the deep learning module. It may not be easy to secure sufficient data for training using a real image sensor.

Through the color decomposition method according to example embodiments, the pseudo-white image similar to the real white image may be generated from the color images. The image data similar to the real RGBW image that is obtained by an RGBW image sensor may be generated using the pseudo-white image.

Demosaicing is digital image processing to generate a full color images or demosaiced images from color images or mosaic images. The color images may be imperfect data obtained by an image sensor including a color filter array CFA. The full color images may be obtained using a plurality of image sensors corresponding different colors, but such methods use spectral band-pass filters and increase cost.

In a more efficient method, one color component may be obtained per pixel by applying a color filter array to an image sensor, and the missing color components may be obtained by an interpolation scheme. Such an interpolation method may cause block noise such as a zipper effect, random color dots, etc. In addition, there exists trade-off between noise filtering and blurring of sharp edges. The interpolation using neighboring pixel value may result in degradation of image quality, which is caused by averaging of pixel crossing an edge in an image.

General methods of demosaicing CFA images or mosaic images may tend to reduce image detail and cause artifacts such as false color, jagging, etc. When demosaicing is divided into stages and a color channel of a previous stage is used to restore in a next stage, errors may be accumulated.

As will be described in further detail below with reference to FIGS. 12 through 15, a demosaicing method based on deep learning according to example embodiments may reduce image artifacts by restoring demosaiced color images using an artificial neural network having enhanced nonlinearity.

Figure 12:
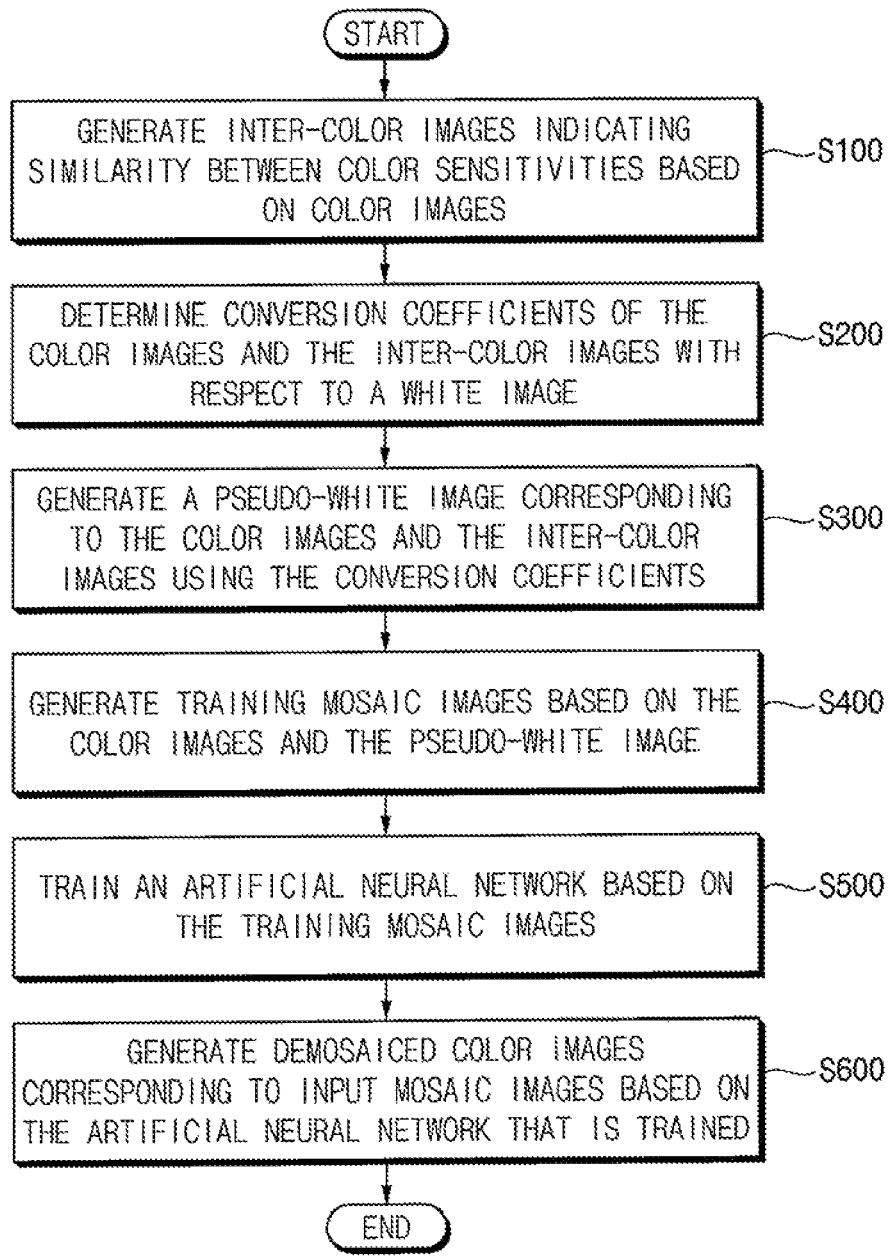
FIG. 12 is a flow chart illustrating a demosaicing method based on deep learning according to example embodiments.

FIG. 12 is a flow chart illustrating a demosaicing method based on deep learning according to example embodiments.

Referring to FIG. 12, inter-color images indicating similarity between color sensitivities may be generated based on color images (S100). The similarity between color sensitivities may be varied according to a wavelength of a light incident on an image sensor. As described above with reference to FIG. 6, the similarity between color sensitivities may increase as a difference between color pixel values decreases in a condition of the same brightness.

Conversion coefficients of the color images and the inter-color images with respect to a white image may be determined (S200). In some example embodiments, as described above with reference to FIG. 5, the conversion coefficients may be determined using a least square method based on a matrix including color pixel values of the color images and inter-color pixel values of the inter-color images as components of the matrix, and real white pixel values may be obtained, for example, by an RGBW image sensor. In some example embodiments, as described above with reference to FIG. 5, the inter-color pixel value of the inter-color image may be a square root of a multiplication of color pixel values of different color images corresponding to the inter-color image.

A pseudo-white image corresponding to the color images and the inter-color images may be generated using the conversion coefficients (S300). The pseudo-white image is differentiated from the read white image that is obtained using a real image sensor including white pixels.

In some example embodiments, the pseudo-white image may be provided as additional information for deep learning of an artificial neural network associated with image processing.

Training mosaic images may be generated based on the color images and the pseudo-white image (S400). The generation of the training mosaic images will be described with reference to FIG. 13.

An artificial neural network may be trained based on the training mosaic images (S500). Demosaiced color images corresponding to input mosaic images may be generated based on the artificial neural network that is trained (S600). Training of the artificial neural network and the generation of the demosaiced color images will be described with reference to FIGS. 14 and 15.

Figure 13:
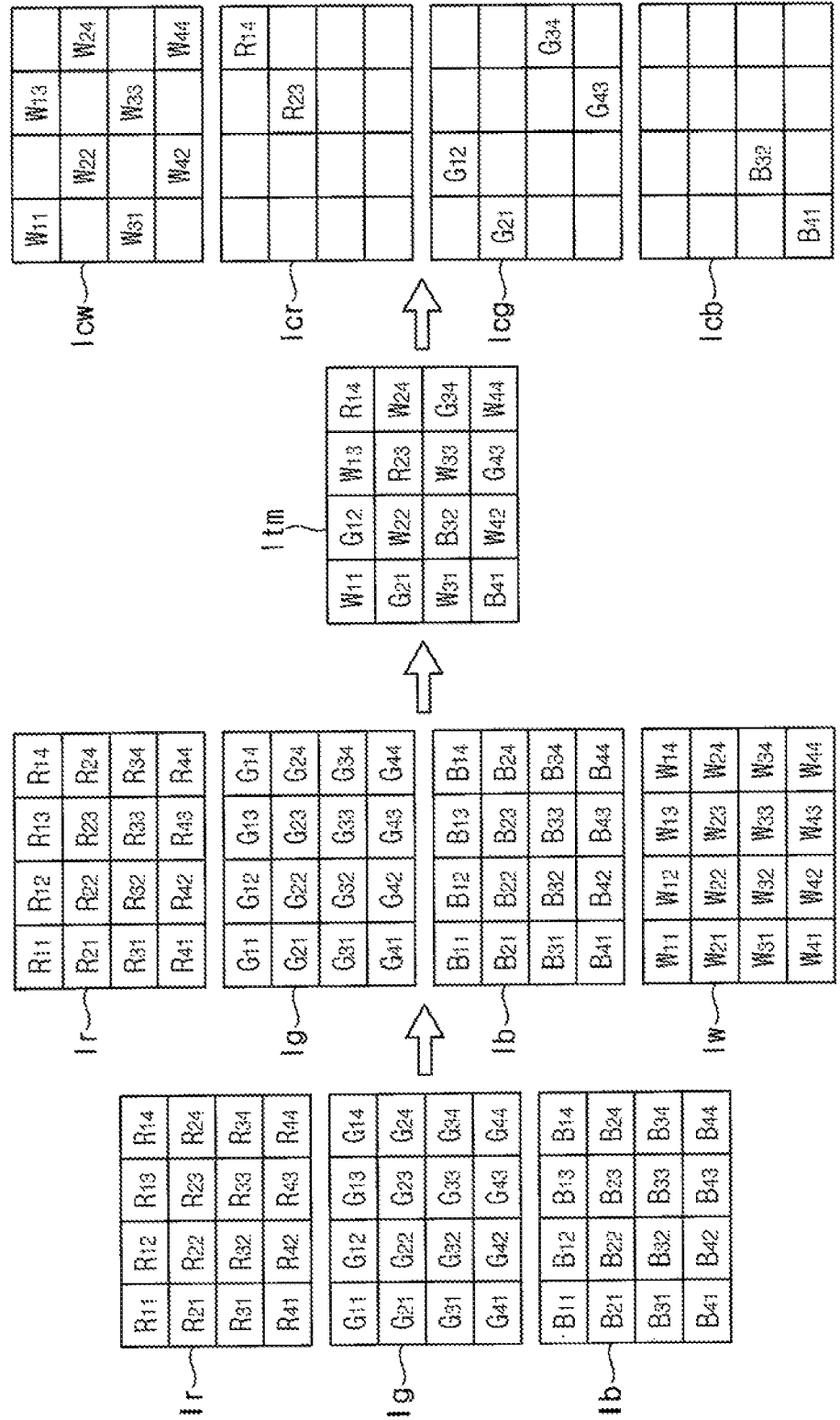
FIG. 13 is a diagram illustrating images corresponding tow a demosaicing method based on deep learning according to example embodiments.

FIG. 13 is a diagram illustrating images corresponding to a demosaicing method based on deep learning according to example embodiments.

FIG. 13 illustrates a red image Ir, a green image Ig, a blue image Ib, a pseudo-white image Iw, a training mosaic image Itm, a first channel image Icw, a second channel image Icr, a third channel image Icg, and a fourth channel image Icb, wherein each image is composed of four pixel rows and four pixel columns. FIG. 13 illustrates a non-limiting example that each image includes sixteen pixels, but example embodiments are not limited thereto.

The red image Ir includes 4*4 red pixel values R11~Rnm, the green image Ig includes 4*4 green pixel values G11~Gnm, the blue image Ib includes 4*4 blue pixel values B11~Bnm, and the white image Iw includes 4*4 white pixel values W11~W44. The training mosaic image Itm includes 4*4 pixel values W11, G12, W13, R14, G21, W22, R23, W24, W31, B32, W33, G34, B41, W42, G43, and W44. As illustrated in FIG. 13, the pixel values in the different images correspond to each other according to pixel positions.

Using the color decomposition method described above, the pseudo-white image Iw may be generated from the red image Ir, the green image Ig, and the blue image Ib.

As illustrated in FIG. 13, the respective pixel values of the red image Ir, the green image Ig, and the blue image Ib may be extracted to generate the training mosaic image Itm corresponding to an RGBW image.

The pixel values of the training mosaic image Itm may be split per color to generate the first channel image Icw, the second channel image Icr, the third channel image Icg, and the fourth channel image Icb. Each of the first channel image Icw, the second channel image Icr, the third channel image Icg, and the fourth channel image Icb may include 4*4 pixel values such that empty blocks of the first channel image Icw, the second channel image Icr, the third channel image Icg, and the fourth channel image Icb indicate the pixel values of zero.

As will be described in further detail below with reference to FIG. 14, the first channel image Icw, the second channel image Icr, the third channel image Icg, and the fourth channel image Icb may be input to an artificial neural network to generate demosaiced color images Idr, Idg, and Idb and supervised learning may be performed based on a result of comparing the demosaiced color images Idr, Idg, and Idb with the color images Ir, Ig, and Ib corresponding to ground truth images.

Figure 14:
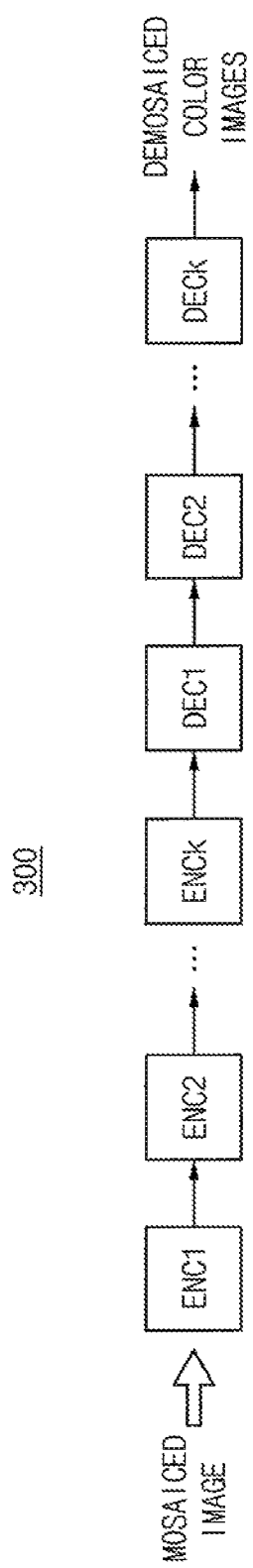
FIG. 14 is a block diagram illustrating a structure of an artificial neural network for a demosaicing method based on deep learning according to example embodiments.
Figure 15:
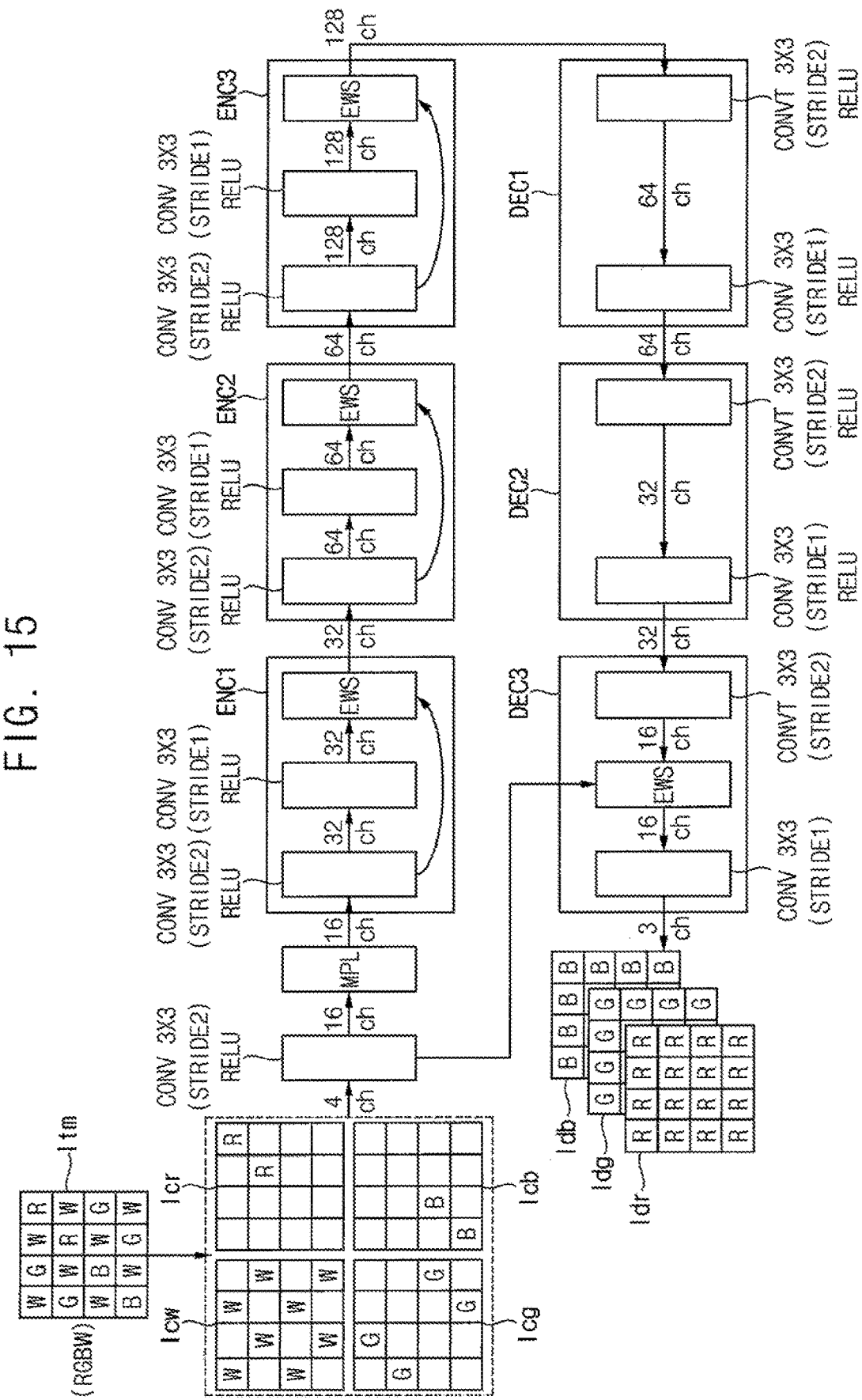
FIG. 15 is a block diagram illustrating an example embodiment of an artificial neural network for a demosaicing method based on deep learning according to example embodiments.

FIG. 14 is a block diagram illustrating a structure of an artificial neural network for a demosaicing method based on deep learning according to example embodiments, and FIG. 15 is a block diagram illustrating an example embodiment of an artificial neural network for a demosaicing method based on deep learning according to example embodiments.

Referring to FIG. 14, an artificial neural network performing a demosaicing method according to example embodiments may be implemented as a convolutional neural network (CNN) 300 having an encoder-decoder structure.

The CNN 300 may include a plurality of encoders ENC1~ENCk and a plurality of decoders DEC1~DECk, which are cascade-connected. The CNN 300 may be trained or learned to generate demosaiced color images based on mosaic images or mosaiced images.

In some example embodiments, as illustrated in FIG. 15, the CNN 300 may include three encoders ENC1, ENC2, and ENC3 (which are configured to sequentially perform down-sampling based on an input mosaic image) and three decoders DEC1, DEC2, and DEC3 (which are configured to sequentially perform up-sampling).

The encoders ENC1, ENC2, and ENC3 may include at least one convolution layer CONV having a predetermined kernel size (e.g., 3*3 size) and stride sizes STRIDE1 and STRIDE2.

The decoders DEC1, DEC2, and DEC3 may include a de-convolution layer CONVT and a convolution layer CONV.

At least one of the encoders ENC1, ENC2, and ENC3 and the decoders DEC1, DEC2, and DEC3 may include a summing layer EWS to perform an elementary-wise sum.

The de-convolution layer CONVT and the convolution layer CONV may include a rectified linear layer RELU.

The encoders ENC1, ENC2, and ENC3 may sequentially perform down-sampling and training of residual components based on the input mosaic image or the training mosaic image Itm to generate encoded image maps. The decoders DEC1, DEC2, and DEC3 may sequentially perform up-sampling and restoring of resolution based on the encoded image maps to generate the demosaiced color images Idr, Idg, and Idb.

The artificial neural network of FIG. 15 is based on deep learning to restore RGB demosaiced images from an RGBW mosaic image that is obtained by the color decomposition method as described above. In the RGBW pattern of the input image, the pixel values are split per white, red, green, and blue to generate different channel signals Icw, Icr, Icg, and Icb that are input to the artificial neural network. The residual components may be trained through the encoders and the resolution may be restored through the decoders. The high-frequency components of the input signal may be reserved through skip-connection corresponding to the curved arrows in FIG. 15. As such, the artificial neural network may generate the three-channel demosaiced images Idr, Idg, and Idb that are restored finally.

FIG. 16 is a diagram illustrating parameters of the artificial neural network of FIG. 15, and FIG. 17 is a diagram illustrating effects of a demosaicing method based on deep learning according to example embodiments.

In FIG. 16, INL and MPL indicate an input layer and a maximum pooling layer disposed in a front portion of the artificial neural network, respectively. WIDTH and HEIGHT indicate a row size and a column size of an image or an image map input to each layer, respectively. NOF indicates a number of filters or channels and NOP indicates a number of parameters of each layer.

FIG. 17 illustrates a peak signal-to-noise ratio (PSNR) in units of decibel (dB), and complexity or operation amounts TOPs in units of tera with respect to general first through fourth cases CS1~CS4 and a case CSp according to example embodiments.

As illustrated in FIGS. 16 and 17, the PSNR may be enhanced through the color decomposition method and the demosaicing method based on deep learning according to example embodiments in comparison with the general methods. Further, the operation amounts TOPs may be significantly reduced and thus the methods according to example embodiments may be easily applied to mobile devices. The demosaicing method according to example embodiments may enhance quality of the demosaiced images and simultaneously reduce the operation amounts to $1/30$~$1/100$ of the general operation amounts.

Figure 18:
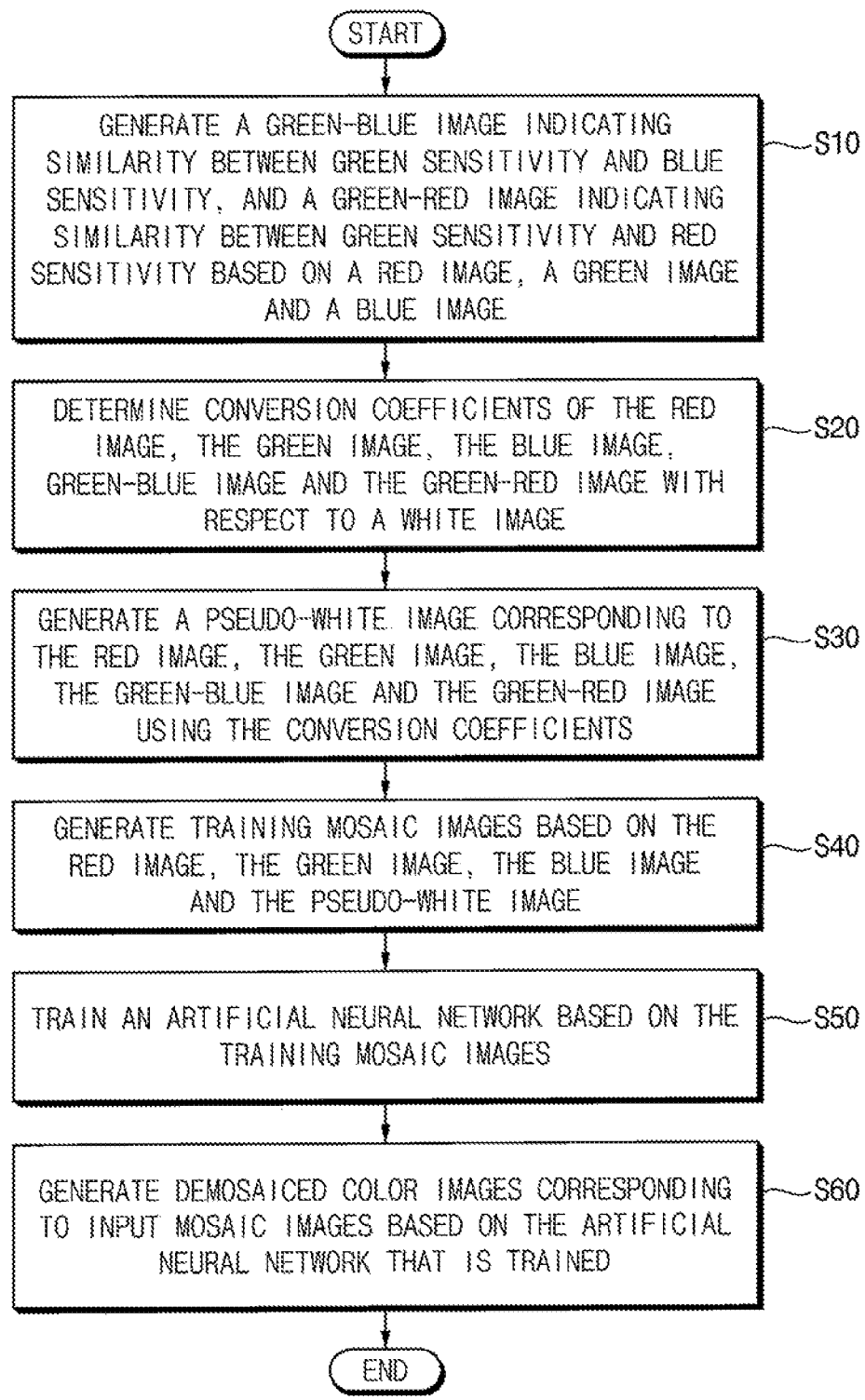
FIG. 18 is a flow chart illustrating a demosaicing method based on deep learning according to example embodiments.

FIG. 18 is a flow chart illustrating a demosaicing method based on deep learning according to example embodiments.

Referring to FIG. 18, a green-blue image indicating similarity between green sensitivity and blue sensitivity, and a green-red image indicating similarity between green sensitivity and red sensitivity may be generated based on a red image, a green image, and a blue image (S10).

The similarity between the red sensitivity, the green sensitivity, and the blue sensitivity may be varied according to a wavelength of a light incident on an image sensor as described above with reference to FIG. 6.

As described above, the similarity between the red sensitivity and green sensitivity may increase as a difference between the red pixel value and the green pixel value decreases in a condition of the same brightness. In addition, the similarity between the blue sensitivity and green sensitivity may increase as a difference between the blue pixel value and the green pixel value decreases in a condition of the same brightness.

As described above, the green-blue pixel value may be a square root of a multiplication of the green pixel value and the blue pixel value, and the green-red pixel value may be a square root of a multiplication of the green pixel value and the red pixel value.

Conversion coefficients of the red image, the green image, the blue image, the green-blue image, and the green-red image with respect to a white image may be determined (S20).

In some example embodiments, as described above with reference to FIG. 5, the conversion coefficients may be determined using a least square method based on a matrix including the red pixel values of the red image, the green pixel values of the green image, the blue pixel values of the blue image, the white pixel values of the real white image (which are obtained using an RGBW image sensor), the green-blue pixel values of the green-blue image, and the green-red pixel values of the green-red image as components of the matrix.

A pseudo-white image corresponding to the red image, the green image, the blue image, the green-blue image, and the green-red image may be generated using the conversion coefficients (S30).

Training mosaic images may be generated based on the red image, the green image, the blue image, and the pseudo-white image (S40). The generation of the training mosaic images is the same as described with reference to FIG. 13.

An artificial neural network may be trained based on the training mosaic images (S50). Demosaiced color images corresponding to an input mosaic image may be generated based on the artificial neural network that is trained (S60). The input mosaic image may have an RGBW pattern and the demosaiced color images may include a demosaiced red image, a demosaiced green image, and a demosaiced blue image. Training of the artificial neural network and the generation of the demosaiced color images are the same as described with reference to FIGS. 14 and 15.

Figure 19:
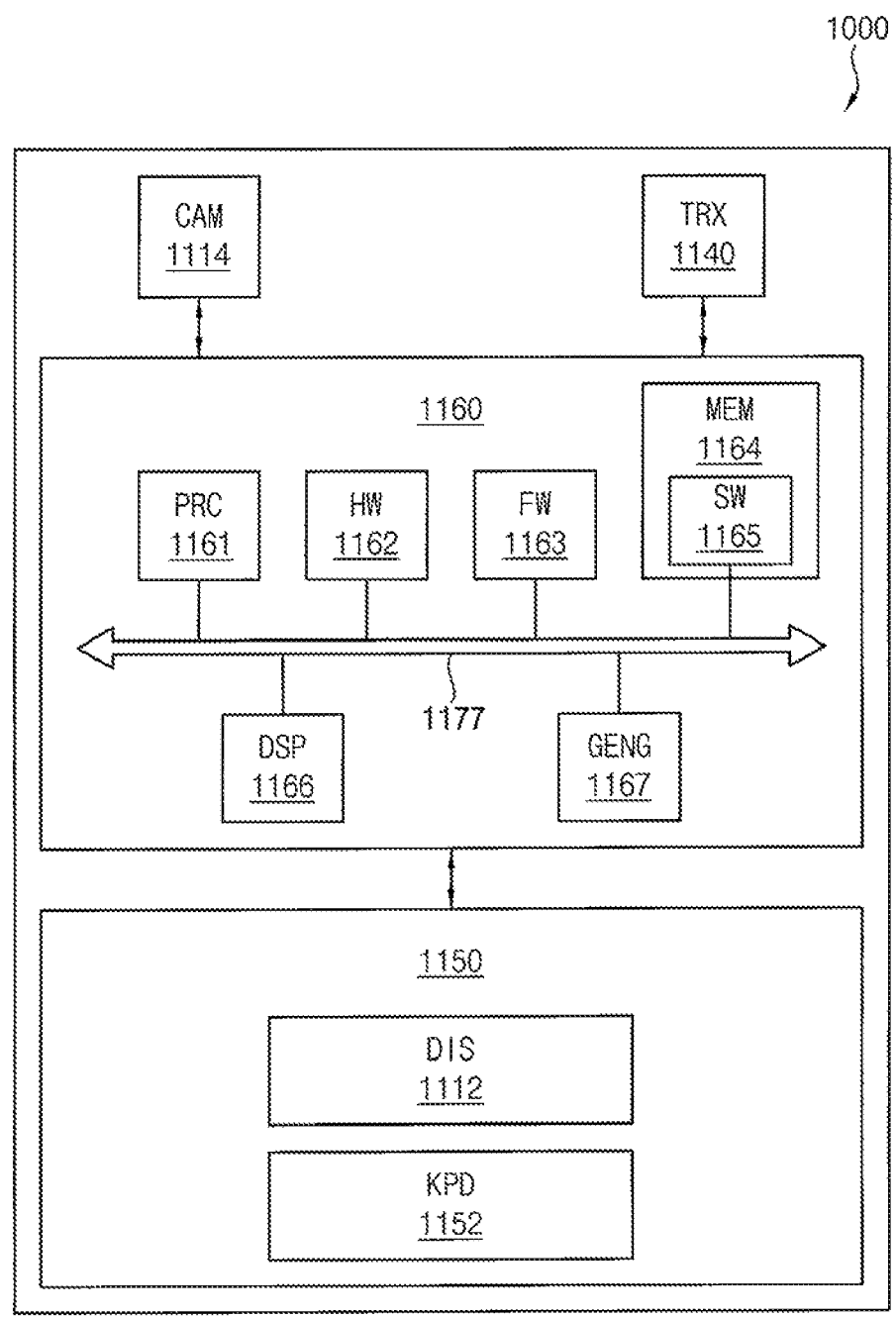
FIG. 19 is a block diagram illustrating a system performing a demosaicing method based on deep learning according to example embodiments.

FIG. 19 is a block diagram illustrating a system performing a demosaicing method based on deep learning according to example embodiments.

Referring to FIG. 19, a system 1000 may include camera module CAM 1114, a transceiver TRX 1140, a control unit 1160, and a user interface 1150.

The camera module 1114 may include a camera and/or an image sensor to capture and provide images. In some example embodiments, the camera module 1114 may include a plurality of cameras to capture a plurality of input images to be merged. In some example embodiments, the camera module 1114 may provide a plurality of input images to be merged where the plurality of input images are captured by a single camera.

The transceiver 1140 may provide connectivity through wired or wireless links to other networks such as an internet, a cellular network, etc.

The user interface 1150 may include input devices KPD 1152, such as a keyboard, a keypad, etc., and a display device DSP 1112 to display images. In some examples, a virtual keypad or keyboard may be integrated into the display device 1112 with a touch screen/sensor or the like.

The control unit 1116 may include a general purpose processor PRC 1161, a hardware device HW 1162, a firmware device FW 1163, a memory MEM 1164, a digital signal processor DSP 1166, a graphics engine GENG 1167, and a bus 1177. The control unit 1160 may perform the color decomposition method and the demosaicing method based on deep learning according to example embodiments. Thus, the control unit 1160 may be configured to perform functions of the color decomposition device and the artificial neural network as described above.

Example embodiments may be implemented as hardware, software, firmware, or a combination thereof.

In some example embodiments, the color decomposition method and the demosaicing method based on deep learning according to example embodiments may be performed by the digital signal processor 1166. For example, the color decomposition device and the artificial neural network as described may be included in the digital signal processor 1166.

In some example embodiments, at least a portion of the methods according to example embodiments may be performed by program instructions that are executed by a processing device. The program instructions may be stored in the memory 1164 as software SW 1165, and the program instructions may be performed by the general purpose processor 1161 and/or the digital signal processor 1166.

In some example embodiments, to execute the program instructions, the general purpose processor 1161 may retrieve or fetch the program instructions from an internal register, an internal cache or the memory 1164 and decode and execute the instructions. During or after execution of the program instructions, the general purpose processor 1161 may write one or more results (which may be intermediate or final results) of the program instructions to the internal register, internal cache, or the memory 1164.

The system 1000 may be a computer system taking any suitable physical form. For example, the system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing methods according to example embodiments may be stored in a computer-readable non-transitory storage medium or media. The computer-readable non-transitory storage medium may include one or more semiconductor-based or other integrated circuits (ICs) (for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL (SD) cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 20:
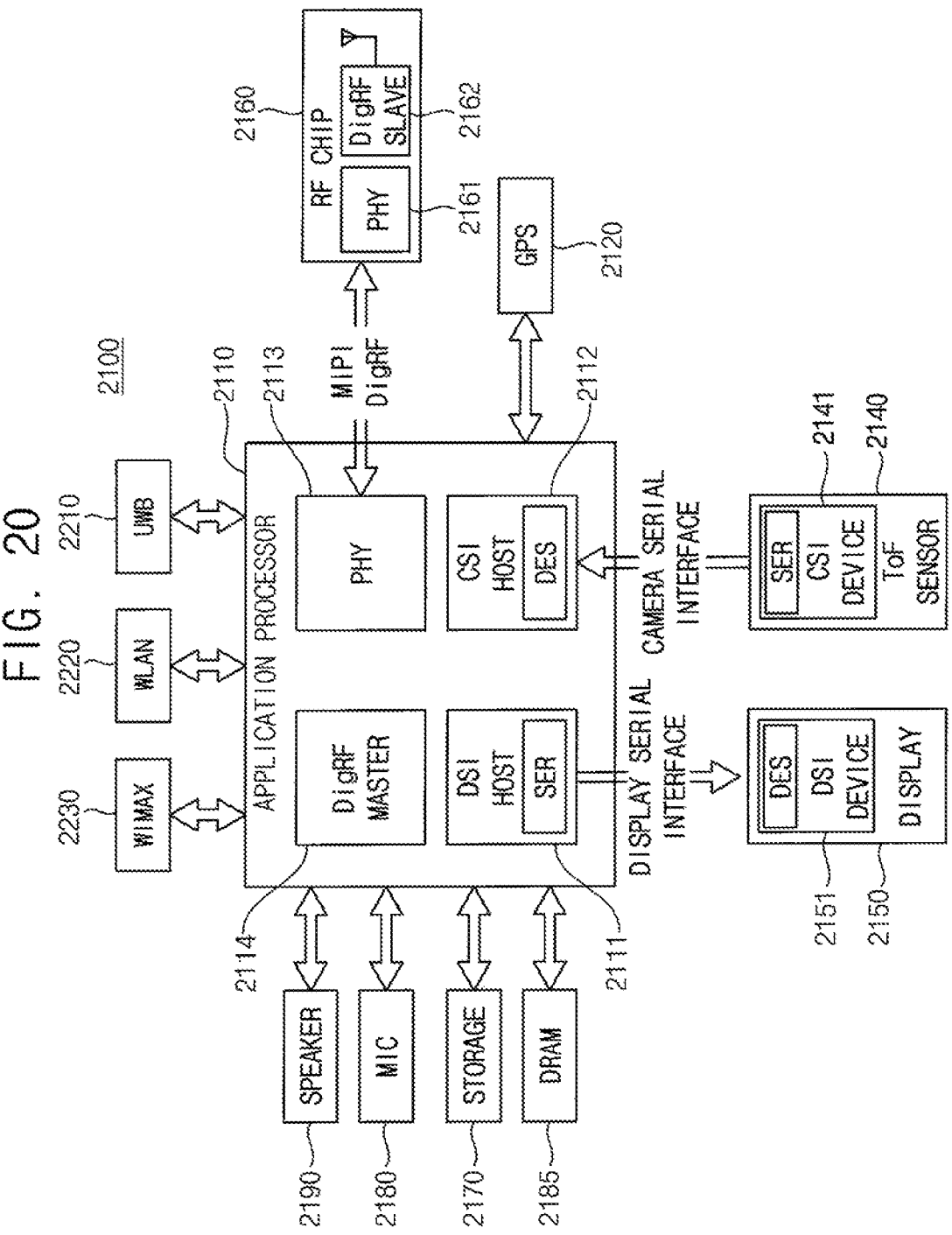
FIG. 20 is a block diagram illustrating an example embodiment of an interface employable in the system of 19 according to example embodiments.

FIG. 20 is a block diagram illustrating an example embodiment of an interface employable in the system of 19 according to example embodiments.

Referring to FIG. 20, a computing system 2100 may be implemented by a data processing device that uses or supports a mobile industry processor interface (MIPI) interface. The computing system 2100 may include an application processor 2110, a three-dimensional image sensor 2140, a display device 2150, etc. A CSI host 2112 of the application processor 2110 may perform a serial communication with a CSI device 2141 of the three-dimensional image sensor 2140 via a camera serial interface (CSI). In some example embodiments, the CSI host 2112 may include a deserializer (DES), and the CSI device 2141 may include a serializer (SER). A DSI host 2111 of the application processor 2110 may perform a serial communication with a DSI device 2151 of the display device 2150 via a display serial interface (DSI).

In some example embodiments, the DSI host 2111 may include a serializer (SER), and the DSI device 2151 may include a deserializer (DES). The computing system 2100 may further include a radio frequency (RF) chip 2160 performing a communication with the application processor 2110. A physical layer (PHY) 2113 of the computing system 2100 and a physical layer (PHY) 2161 of the RF chip 2160 may perform data communications based on a MIPI DigRF. The application processor 2110 may further include a DigRF MASTER 2114 that controls the data communications of the PHY 2161.

The computing system 2100 may further include a global positioning system (GPS) 2120, a storage 2170, a microphone MIC 2180, a DRAM device 2185, and a speaker 2190. In addition, the computing system 2100 may perform communications using an ultra-wideband (UWB) network 2210, a wireless local area network (WLAN) 2220, a worldwide interoperability for microwave access (WIMAX) network 2230, etc. However, the structure and the interface of the computing system 2100 are not limited thereto.

As described above, the color decomposition method according to example embodiments may generate the pseudo-white image similar to a real white image using the inter-color images indicating similarity between color sensitivities. In addition, the demosaicing method based on deep learning according to example embodiments may efficiently perform deep learning of the artificial neural network using the color images and the pseudo-white image and generate the demosaiced images of high quality using the trained artificial neural network that is trained.

As will be appreciated by one skilled in the art, embodiments may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any suitable tangible medium that can contain or store a program for use by or in connection with an instruction execution system, apparatus, or device.

Example embodiments may be applied to any electronic devices and systems performing image processing. For example, example embodiments may be applied to systems such as a computer, a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

As described above, example embodiments may provide a color decomposition method capable of efficiently generating a pseudo-white image from color images. Some example embodiments may provide a demosaicing method capable of efficiently generating demosaiced images using the color decomposition method. The color decomposition method according to example embodiments may generate the pseudo-white image similar to a real white image using the inter-color images indicating similarity between color sensitivities. In addition, the demosaicing method based on deep learning according to example embodiments may efficiently perform deep learning of the artificial neural network using the color images and the pseudo-white image and generate the demosaiced images of high quality using the trained artificial neural network that is trained.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of color decomposition, comprising:
generating inter-color images indicating similarity between color sensitivities based on color images;
determining conversion coefficients of the color images and the inter-color images with respect to a white image; and
generating a pseudo-white image corresponding to the color images and the inter-color images using the conversion coefficients; wherein
the color images include a red image, a green image, and a blue image, and
the inter-color images include a green-blue image indicating similarity between green sensitivity and blue sensitivity, and a green-red image indicating similarity between green sensitivity and red sensitivity.

2. The method as claimed in claim 1, wherein an inter-color pixel value of each inter-color image is a square root of a multiplication of color pixel values of different color images corresponding to the each inter-color image.

3. The method as claimed in claim 1, wherein an inter-color pixel value of the inter-color image increases as the similarity between the color sensitivities increases.

4. The method as claimed in claim 1, wherein a white pixel value of the pseudo-white image decreases as an inter-color pixel value of the inter-color image corresponding to the white pixel value increases.

5. The method as claimed in claim 1, wherein the conversion coefficients of the color images with respect to the white image have positive values, and the conversion coefficients of the inter-color images with respect to the white image have negative values.

6. The method as claimed in claim 1, wherein the conversion coefficients are determined using a least square method based on a matrix including color pixel values of the color images and inter-color pixel values of the inter-color images as components of the matrix.

7. The method as claimed in claim 1, wherein a white pixel value of the pseudo-white image is determined by the following equation, $$W = C_r*R + C_g*G + C_b*B + C_{gb}*GB + C_{gr}*GR$$

wherein W indicates the white pixel value of the pseudo-white image, R indicates a red pixel value of the red image, G indicates a green pixel value of the green image, B indicates a blue pixel value of the blue image, GB indicates a green-blue pixel value of the green-blue image, GR indicates a green-red pixel value of the green-red image, Cr indicates a red conversion coefficient of the red image with respect to the white image, Cg indicates a green conversion coefficient of the green image with respect to the white image, Cb indicates a blue conversion coefficient of the blue image with respect to the white image, Cgb indicates a green-blue conversion coefficient of the green-blue image with respect to the white image, and Cgr indicates a green-red conversion coefficient of the green-red image with respect to the white image.

8. The method as claimed in claim 7, wherein the conversion coefficients are determined using a least square method based on a matrix including red pixel values of the red image, green pixel values of the green image, blue pixel values of the blue image, green-blue pixels values of the green-blue image, and green-red pixel values of the green-red image as components of the matrix.

9. The method as claimed in claim 1, wherein conversion coefficients determined for the red image, the green image, and the blue image have positive values, and conversion coefficients determined for the green-blue image and the green-red image have negative values.

10. The method as claimed in claim 7, wherein the green-blue pixel value of the green-blue image is a square root of a multiplication of the green image and the blue image, and the green-red pixel value of the green-red image is a square root of a multiplication of the green image and the red image.

11. The method as claimed in claim 1, wherein a green-blue pixel value of the green-blue image increases as the similarity between the green sensitivity and the blue sensitivity increases, and a green-red pixel value of the green-red image increases as the similarity between the green sensitivity and the red sensitivity increases.

12. The method as claimed in claim 1, wherein a white pixel value of the pseudo-white image decreases as a green-blue pixel value of the green-blue image corresponding to the white pixel value increases, and the white pixel value of the pseudo-white image decreases as a green-red pixel value of the green-red image corresponding to the white pixel value increases.

13. A method of demosaicing images, comprising:
generating inter-color images indicating similarity between color sensitivities based on color images;
determining conversion coefficients of the color images and the inter-color images with respect to a white image;
generating a pseudo-white image corresponding to the color images and the inter-color images using the conversion coefficients, wherein the color images include a red image, a green image, and a blue image, and the inter-color images include a green-blue image indicating similarity between green sensitivity and blue sensitivity, and a green-red image indicating similarity between green sensitivity and red sensitivity;
generating training mosaic images based on the color images and the pseudo-white image;
training an artificial neural network based on the training mosaic images; and
generating demosaiced color images corresponding to input mosaic images based on the artificial neural network that is trained.

14. The method as claimed in claim 13, wherein the artificial neural network is a convolutional neural network.

15. The method as claimed in claim 14, wherein the artificial neural network includes:
encoders configured to sequentially perform down-sampling and training of residual components based on the input mosaic images to generate encoded image maps; and
decoders configured to sequentially perform up-sampling and restoring of resolution based on the encoded image maps to generate the demosaiced color images.

16. The method as claimed in claim 13, wherein an inter-color pixel value of each inter-color image is a square root of a multiplication of color pixel values of different color images corresponding to the each inter-color image.

17. The method as claimed in claim 13, wherein the conversion coefficients are determined using a least square method based on a matrix including color pixel values of the color images and inter-color pixel values of the inter-color images as components of the matrix.

18. A method of demosaicing images, comprising:
generating a green-blue image indicating similarity between green sensitivity and blue sensitivity and generating a green-red image indicating similarity between green sensitivity and red sensitivity, based on a red image, a green image, and a blue image;
determining conversion coefficients of the red image, the green image, the blue image, the green-blue image, and the green-red image with respect to a white image;
generating a pseudo-white image corresponding to the red image, the green image, the blue image, the green-blue image, and the green-red image using the conversion coefficients;
generating training mosaic images based on the red image, the green image, the blue image, and the pseudo-white image;
training an artificial neural network based on the training mosaic images; and
generating demosaiced color images corresponding to input mosaic images based on the artificial neural network that is trained.

* * * * *